(12) United States Patent
Garza

(10) Patent No.: US 6,820,756 B2
(45) Date of Patent: Nov. 23, 2004

(54) MOTORCYCLE WINDSHIELD STORAGE DEVICE AND ASSOCIATED METHODS

(76) Inventor: Cornelio Antonio Garza, 14613 F.M. 1761, Raymondville, TX (US) 78580

( * ) Notice: Subject to any disclaimer, the term of this patent is extended or adjusted under 35 U.S.C. 154(b) by 0 days.

(21) Appl. No.: 10/064,072

(22) Filed: Jun. 7, 2002

(65) Prior Publication Data

US 2003/0226942 A1 Dec. 11, 2003

(51) Int. Cl.[7] ................................................. A47F 7/00
(52) U.S. Cl. ................................. 211/87.01; 248/309.1; 248/316.8; 296/78.1
(58) Field of Search ........................... 211/87.01, 41.14, 211/85.7, 41.4; 248/309.1, 316.8; 296/78.1, 84.1

(56) References Cited

U.S. PATENT DOCUMENTS

| | | | |
|---|---|---|---|
| 2,903,297 A | 9/1959 | Zbikowski | 296/78.1 |
| 3,602,372 A | 8/1971 | Verrecchio | 211/100 |
| 4,489,973 A | 12/1984 | Willey | 296/78.1 |
| 4,867,465 A | 9/1989 | Dunchock | 280/79.3 |
| 5,658,035 A * | 8/1997 | Armstrong | 296/78.1 |
| 5,732,965 A | 3/1998 | Willey | 280/288.4 |
| 5,845,955 A | 12/1998 | Willey | 296/78.1 |
| 5,853,217 A | 12/1998 | Armstrong | 296/78.1 |
| 6,203,104 B1 | 3/2001 | Matsuo et al. | 297/188.1 |
| 6,254,166 B1 * | 7/2001 | Willey | 296/78.1 |
| 2002/0153462 A1 * | 10/2002 | Donahue | 248/316.8 |
| 2003/0052031 A1 * | 3/2003 | Poore | 206/448 |

* cited by examiner

*Primary Examiner*—Robert W. Gibson, Jr.
(74) *Attorney, Agent, or Firm*—Novak Druce, LLP

(57) ABSTRACT

A windshield storage device operable for mounting a detachable/removable windshield on a wall structure includes a frame structure, one or more brackets connected to the frame structure, wherein the one or more brackets are operable for attaching the frame structure to the wall structure, and one or more receiving mechanisms connected to the frame structure, wherein the one or more receiving mechanisms are operable for receiving one or more attachment mechanisms of the detachable/removable windshield. The frame structure includes an upper member, a lower member, and two side members. The one or more brackets are operable for fixedly or removably attaching the frame structure to the wall structure. The windshield storage device also optionally includes a headlight connected to the frame structure and two turn signal lights connected to the frame structure and a power supply coupled to the frame structure.

13 Claims, 4 Drawing Sheets

MOTORCYCLE WINDSHIELD STORAGE DEVICE AND ASSOCIATED METHODS

BACKGROUND OF INVENTION

1. Technical Field

The present invention relates generally to a motorcycle windshield storage device and associated methods. More specifically, the present invention relates to a motorcycle windshield wall bracket and methods for mounting and/or storing a detachable or removable motorcycle windshield on a wall or other structure when not in use.

2. Background Information

Motorcycles, scooters, and the like represent a popular form of transportation and recreation in both the United States and throughout the world. These vehicles are commonly used for both long-distance, high-speed travel (such as highway travel) and short-distance, low-speed travel (such as street travel or cruising). In the case of long-distance, high-speed travel, it is typically desirable for the motorcycle, scooter, or the like to incorporate a windshield. The windshield is operable for protecting a rider's exposed upper body from bugs, rocks, and other debris, as well as for reducing the wind force on the rider's exposed upper body and minimizing fatigue. In the case of short-distance, low-speed travel, however, the windshield is typically not necessary and goggles or sunglasses may suffice. Because of this, many motorcycles, scooters, and the like are equipped with a detachable or removable windshield.

The detachable or removable windshield typically includes a substantially transparent, shatter-resistant shield or plate made of plastic, tempered glass, or the like. The detachable or removable windshield also typically includes one or more support members, providing the transparent, shatter-resistant shield or plate with support, shape, and/or strength. The detachable or removable windshield further typically includes one or more attachment mechanisms. These attachment mechanisms are operable for securing the windshield to the front portion of the motorcycle, scooter, or the like. The attachment mechanisms can include, for example, a plurality of nuts and bolts, one or more clamping or engaging mechanisms (such as ring connectors, mounting bosses, male-female connectors, pins, etc.), or the like.

However, a storage problem arises when the detachable or removable windshield is removed from the motorcycle, scooter, or the like. Because the transparent, shatter-resistant shield or plate typically has a substantially oval, egg-like, or irregular shape, the transparent, shatter-resistant shield or plate and the removable or detachable windshield have no stability when placed on the floor, ground, or a table. The detachable or removable windshield is also typically too large to be placed on a shelf. Due to this lack of stability, the detachable or removable windshield is prone to falling over, causing scratches, scuffs, and other marks on the surface of the plastic or glass material making up the transparent, shatter-resistant shield or plate. This can render the windshield unsafe as the rider's vision may be partially or wholly obstructed. Such scratches, scuffs, and other marks are also uncomplimentary to the aesthetics of the motorcycle, scooter, or the like.

Thus, what is needed is a device and associated methods that allow a detachable or removable windshield to be mounted or stored on a wall or other structure when not in use. In this manner, the windshield is protected from scratches, scuffs, and other marks and is out of the way for storing, or while repairs are made to a motorcycle, scooter, or the like. What is also needed is a device that allows a detachable or removable windshield to be mounted or stored on a wall or other structure when not in use that maintains the aesthetics of a garage or other storage area.

SUMMARY OF INVENTION

In various embodiments, the present invention provides a motorcycle windshield wall bracket and methods for mounting and/or storing a detachable or removable motorcycle windshield on a wall or other structure when not in use, protecting the detachable or removable windshield from scratches, scuffs, and other marks. Advantageously, the motorcycle windshield wall bracket of the present invention also allows the detachable or removable windshield to be stored out of the way while, for example, repairs are made to a motorcycle, scooter, or the like. Further, the motorcycle windshield wall bracket of the present invention can be manufactured or modified to compliment the aesthetics of a garage or other storage area.

In one embodiment of the present invention, a windshield storage device operable for mounting a detachable/removable windshield on a wall structure includes a frame structure, one or more brackets connected to the frame structure, wherein the one or more brackets are operable for attaching the frame structure to the wall structure, and one or more receiving mechanisms connected to the frame structure, wherein the one or more receiving mechanisms are operable for receiving one or more attachment mechanisms of the detachable/removable windshield. In one embodiment, the frame structure includes an upper member, a lower member, and two side members. Preferably, the frame structure has a substantially rectangular shape, suitable for windshields of a variety of widths. However, the shape of the frame structure is not to be construed as limited to such shape, and can be any shape suitable for supporting a windshield. The one or more brackets are operable for fixedly or removably attaching the frame structure to the wall structure. The one or more receiving mechanisms can include one or more nuts and bolts, clamping or engaging mechanisms, ring connectors, mounting bosses, male-female connectors, or pins. The detachable/removable windshield can include a detachable/removable motorcycle or scooter windshield. The windshield storage device also optionally includes a headlight connected to the frame structure and two turn signal lights connected to the frame structure. The windshield storage device can further optionally include a power supply coupled to the frame structure.

In another embodiment of the present invention, a method for mounting/storing a detachable/removable windshield on a wall structure includes providing a frame structure, providing one or more brackets connected to the frame structure, wherein the one or more brackets are operable for attaching the frame structure to the wall structure; providing one or more receiving mechanisms connected to the frame structure, wherein the plurality of receiving mechanisms are operable for receiving a plurality of attachment mechanisms of the detachable/removable windshield; and removably attaching the detachable/removable windshield to the frame structure. The frame structure preferably includes an upper member, a lower member, and two side members. Preferably, the frame structure has a substantially rectangular shape suitable for accommodating a variety of differently sized windshields. The frame structure can be fixedly or removable attached to the wall structure. The one or more receiving mechanisms can include but are not limited to one or more nuts and bolts, clamping or engaging mechanisms, ring connectors, mounting bosses, male-female connectors, or pins. The detachable/removable windshield can include a detachable/removable motorcycle or scooter windshield. The method also optionally includes providing a headlight connected to the frame structure and two turn signal lights connected to the frame structure. Further, the windshield storage device optionally includes providing a power supply coupled to the frame structure.

DETAILED DESCRIPTION

Figure 1:
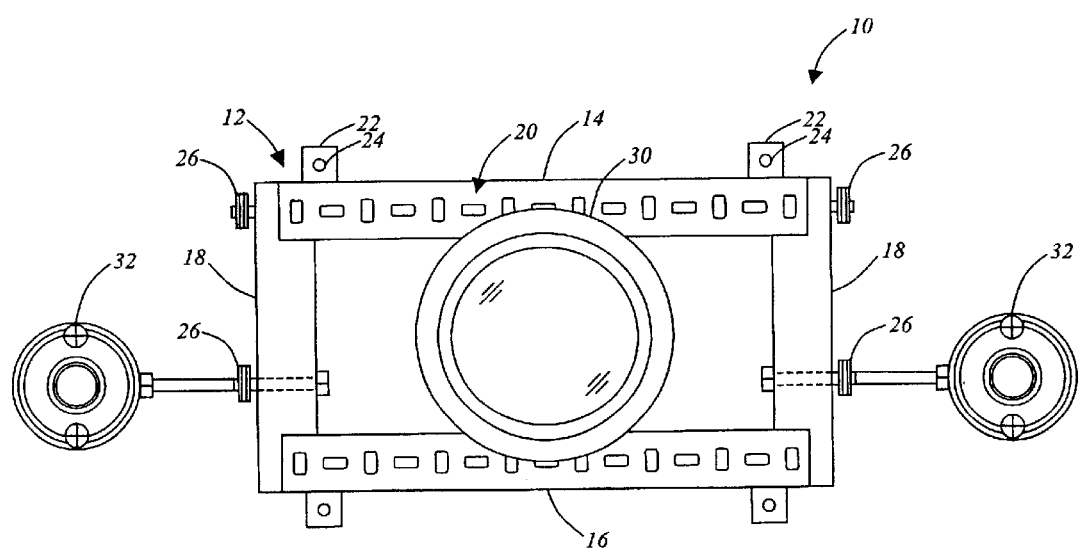
FIG. 1 is a front plan view of one embodiment of the motorcycle windshield wall bracket of the present invention.

Referring to FIG. 1, in one embodiment of the present invention, the motorcycle windshield wall bracket 10 includes a frame structure 12. As illustrated, the frame structure 12 includes an upper member 14, a lower member 16, and two (2) side members 18. The upper member 14, the lower member 16, and the two side members 18 can be made from a variety of material such as metal (e.g., steel or aluminum), plastic, wood, composites, or any other suitable formable, load-bearing material. Optionally, the upper member 14 and the lower member 16 can include a plurality of holes 20, making the frame structure 12 lightweight and reducing the overall production cost of the motorcycle windshield wall bracket 10. Preferably, the frame structure 12 has a substantially rectangular shape, however, any other suitable shape can be utilized. The components of the frame structure 12, including the upper member 14, the lower member 16, and the two side members 18, can be integrally formed, or the components can be joined by welding, using nuts and bolts, or via any other suitable connection method.

Preferably, the frame structure 12 is between about 3 inches and about 8 inches in height, and about 5 inches and about 15 inches in width. In one exemplary embodiment, the frame structure 12 is about 4.5 inches in height, and about 12.25 inches in width. In another exemplary embodiment, the frame structure 12 is about 4.5 inches in height, and about 9.75 inches in width. The components of the frame structure 12, including the upper member 14, the lower member 16, and the two side members 18, can have, for example, a substantially rectangular, square, oval, or round cross-sectional shape.

Figure 2:
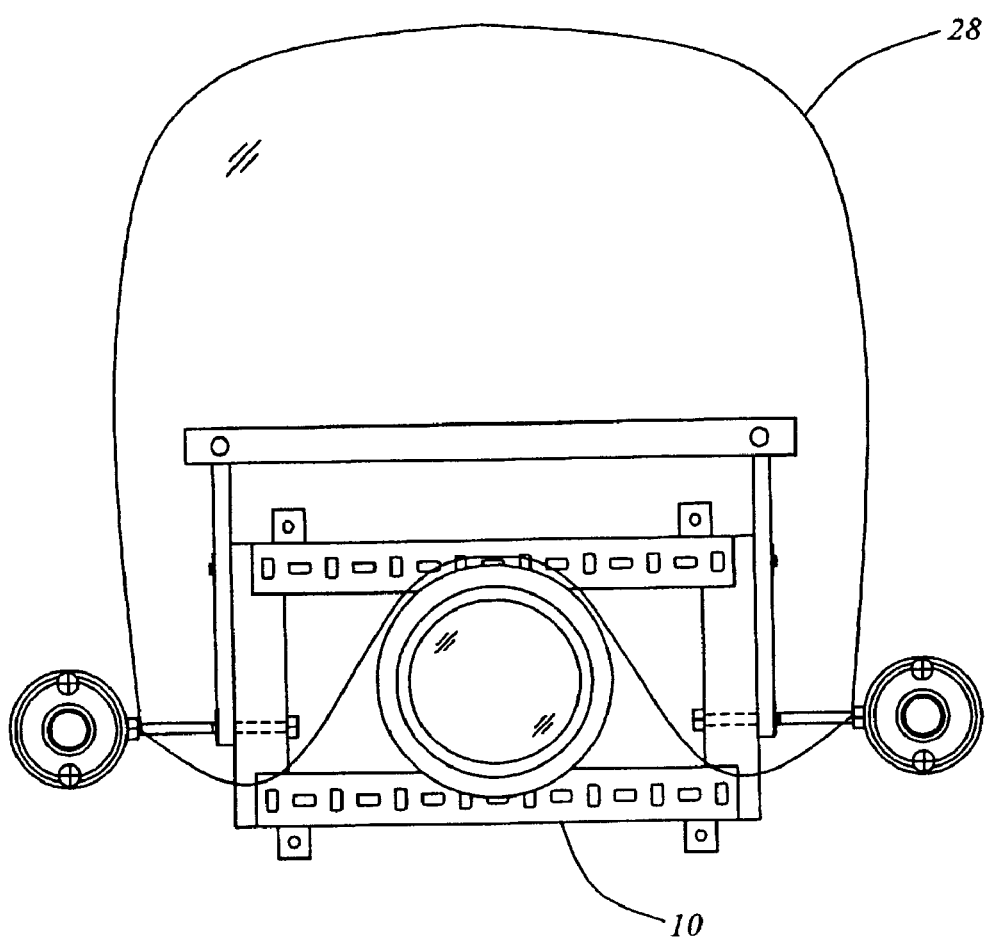
FIG. 2 is a front plan view of one embodiment of the motorcycle windshield wall bracket of the present invention, having a detachable or removable windshield mounted thereon for storage.

The frame structure 12 includes one or more brackets 22 operable for attaching the motorcycle windshield wall bracket 10 to a wall or other structure. For example, each of the plurality of brackets 22 can include a hole 24 suitable for receiving a wood or masonry screw. The frame structure 12 also includes one or more receiving mechanisms 26 suitable for receiving one or more attachment mechanisms of a detachable or removable windshield. These receiving mechanisms 26 and/or attachment mechanisms can include, for example, one or more nuts and bolts, one or more clamping or engaging mechanisms (such as ring connectors, mounting bosses, male-female connectors, pins, etc.), or the like. In the embodiment shown, mounting bosses are utilized. Referring to FIG. 2, the detachable or removable windshield 28 should be mounted on the motorcycle windshield wall bracket 10 in the same manner that the detachable or removable windshield 28 is mounted on the front portion of a motorcycle, scooter, or the like.

Figure 3:
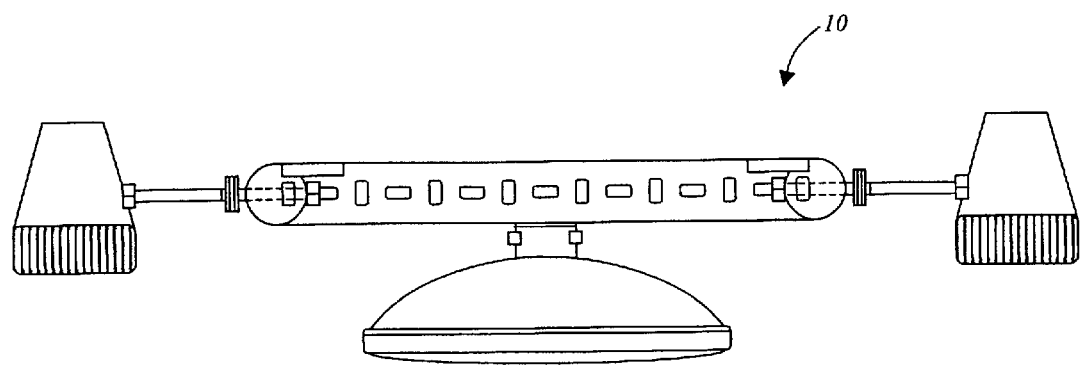
FIG. 3 is a top view of one embodiment of the motorcycle windshield wall bracket of the present invention.

Referring again to FIG. 1, a headlight 30 and two (2) turn signal lights 32 can be mounted on the motorcycle windshield wall bracket 10, providing the motorcycle windshield wall bracket 10 with the appearance of a motorcycle, scooter, or the like. The headlight 30 and the two turn signal lights 32 can be operable or inoperable (i.e ., the headlight 30 and the two turn signal lights 32 can be chromed/painted facsimiles). If the headlight 30 and two turn signal lights 32 are operable, a battery pack, power supply cord, or other power source and an on/off switch can be incorporated into the motorcycle windshield wall bracket 10. FIG. 3 shows the motorcycle windshield wall bracket 10 from the top.

Figure 4:
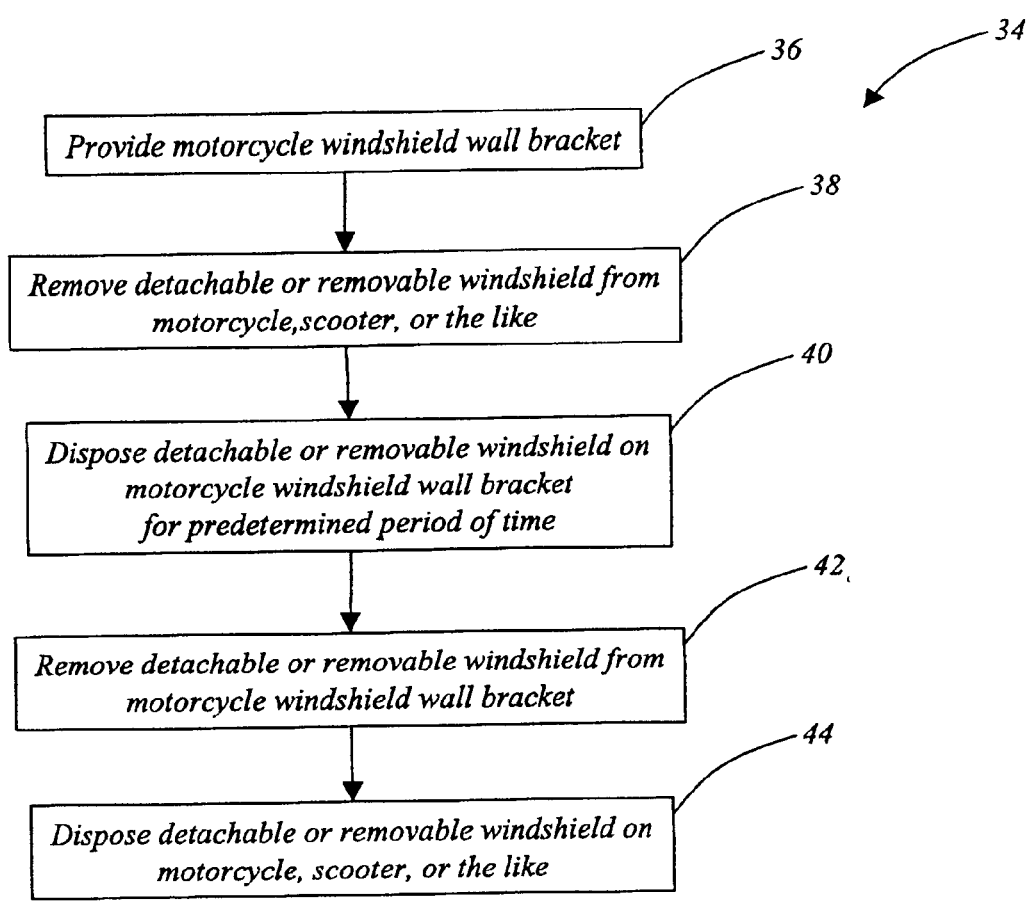
FIG. 4 is a block diagram of one embodiment of a method for mounting and/or storing a detachable or removable motorcycle windshield using the motorcycle windshield wall bracket of the present invention.

Referring to FIG. 4, in another embodiment of the present invention, a method 34 for mounting and/or storing a detachable or removable motorcycle windshield includes providing a motorcycle windshield wall bracket. (Block 36). The method 34 also includes removing the detachable or removable windshield from a motorcycle, scooter, or the like. (Block 38). The method 34 further includes disposing the detachable or removable windshield on the motorcycle windshield wall bracket for a predetermined period of time. (Block 40). The method 34 further includes removing the detachable or removable windshield from the motorcycle windshield wall bracket. (Block 42). Finally, the method 34 includes disposing the detachable or removable windshield on the motorcycle, scooter, or the like.

Although the present invention has been shown and described with reference to preferred embodiments and examples thereof, other embodiments and examples may achieve the same results and/or perform similar functions. Accordingly, changes in and modifications to the present invention will be apparent to those of ordinary skill in the art without departing from the spirit or scope of the present invention. The following claims are intended to cover all such equivalent embodiments and examples.

What is claimed is:

1. A windshield storage device operable for mounting a detachable/removable windshield on a wall structure, the windshield storage device comprising:

a frame structure for supporting the windshield;

one or more brackets connected to the frame structure, wherein the one or more brackets are operable for attaching the frame structure to the wall structure;

one or more receiving mechanisms connected to the frame structure, wherein the one or more receiving mechanisms are operable for receiving one or more attachment mechanisms of the detachable/removable windshield; and at least one of (i) a headlight, (ii) two turn signal lights, and (iii) a power supply being coupled to the frame structure.

2. The windshield storage device of claim 1, the frame structure further comprising an upper member.

3. The windshield storage device of claim 1, the frame structure further comprising a lower member.

4. The windshield storage device of claim 1, the frame structure further comprising two side members.

5. The windshield storage device of claim 1, wherein the frame structure has a substantially rectangular shape.

6. The windshield storage device of claim 1, wherein the one or more brackets are operable for fixedly attaching the frame structure to the wall structure.

7. The windshield storage device of claim 1, wherein the one or more brackets are operable for removably attaching the frame structure to the wall structure.

8. The windshield storage device of claim 1, the one or more receiving mechanisms further comprising one or more receiving mechanisms selected from the group consisting of one or more nuts and bolts, clamping or engaging mechanisms, ring connectors, mounting bosses, male-female connectors, and pins.

9. The windshield storage device of claim 1, the detachable/removable windshield further comprising a detachable/removable motorcycle windshield.

10. The windshield storage device of claim 1, the detachable/removable windshield further comprising a detachable/removable scooter windshield.

11. A method for mounting/storing a detachable/removable windshield on a wall structure, the method comprising:

providing a frame structure for supporting the windshield;

providing one or more brackets connected to the frame structure, wherein the one or more brackets are operable for attaching the frame structure to the wall structure;

providing one or more receiving mechanisms connected to the frame structure, wherein the one or more receiving mechanisms are operable for receiving one or more attachment mechanisms of the detachable/removable windshield;

removably attaching the detachable/removable windshield to the frame structure; and providing at least one of (i) a headlight, (ii) two turn signal lights, and (iii) a power supply coupled to the frame structure.

12. The method of claim 11, further comprising the step of fixedly attaching the frame structure to the wall structure.

13. The method of claim 11, further comprising the step of removably attaching the frame structure to the wall structure.

* * * * *